(12) United States Patent
White

(10) Patent No.: US 10,500,507 B2
(45) Date of Patent: *Dec. 10, 2019

(54) SIMULATOR RIDE

(71) Applicant: Universal City Studios LLC, Universal City, CA (US)

(72) Inventor: Nathanael G. White, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 232 days.

This patent is subject to a terminal disclaimer.

(21) Appl. No.: 15/586,986

(22) Filed: May 4, 2017

(65) Prior Publication Data

US 2017/0232352 A1 Aug. 17, 2017

Related U.S. Application Data

(63) Continuation of application No. 14/704,201, filed on May 5, 2015, now Pat. No. 9,643,094.

(51) Int. Cl.
*A63G 21/08* (2006.01)
*A63G 21/20* (2006.01)
(Continued)

(52) U.S. Cl.
CPC ............. *A63G 21/08* (2013.01); *A63G 21/06* (2013.01); *A63G 21/20* (2013.01); *A63G 21/22* (2013.01); *B61B 3/02* (2013.01); *G06F 3/1431* (2013.01)

(58) Field of Classification Search
CPC ... A63G 1/00; A63G 1/28; A63G 1/30; A63G 1/36; A63G 1/44; A63G 21/00;
(Continued)

(56) References Cited

U.S. PATENT DOCUMENTS 5,272,984 A  12/1993  Bolliger et al.
5,791,903 A   8/1998  Feuer et al.
(Continued)

FOREIGN PATENT DOCUMENTS

CN   2892217    4/2007
EP    952879   11/1999
JP   H08131658  5/1996

OTHER PUBLICATIONS

PCT/US2016/029210 Invitation to Pay Additional Fees dated Jul. 19, 2016.
(Continued)

*Primary Examiner* — Robert J McCarry, Jr.
(74) *Attorney, Agent, or Firm* — Fletcher Yoder P.C.

(57) ABSTRACT

A flying simulator ride in accordance with present embodiments may include a suspended rotator ring capable of motion in six degrees of freedom. The flying simulator ride may also include a passenger support system suspended from the rotator ring wherein the passenger support system includes a first passenger support unit; and a second passenger support unit, wherein at least one of the first passenger support unit or the second passenger support unit are configured to move relative to one another to assume a stacked configuration and a loading configuration, wherein a distance between the rotator ring and the first passenger support unit is decreased in the stacked configuration relative to the loading configuration.

22 Claims, 8 Drawing Sheets

(51) Int. Cl.
*A63G 21/06* (2006.01)
*A63G 21/22* (2006.01)
*B61B 3/02* (2006.01)
*G06F 3/14* (2006.01)

(58) Field of Classification Search
CPC ........ A63G 21/04; A63G 21/08; A63G 31/00; A63G 31/02; B61B 3/00; B61B 7/00; B61B 9/00; B61B 13/00
See application file for complete search history.

(56) References Cited

U.S. PATENT DOCUMENTS

| | | | |
|---|---|---|---|
| 5,979,333 | A | 11/1999 | Houben et al. |
| 8,147,344 | B2 | 4/2012 | Crawford et al. |
| 8,225,555 | B2 | 7/2012 | Magpuri |
| 8,360,893 | B2 | 1/2013 | Howard |
| 8,453,576 | B2 | 6/2013 | Roodenburg et al. |
| 8,684,854 | B2 | 4/2014 | Fisher |
| 8,689,698 | B2 | 4/2014 | Shasha |
| 9,302,190 | B1 | 4/2016 | Jennings |
| 9,303,421 | B1 | 4/2016 | Jennings |
| 9,643,094 | B2 * | 5/2017 | White ............... A63G 21/06 |
| 9,732,535 | B2 | 8/2017 | Jennings |
| 2002/0068641 | A1 | 6/2002 | Dicicco |
| 2002/0162477 | A1 | 11/2002 | Palumbo |
| 2009/0038499 | A1 | 2/2009 | Morris |
| 2011/0132224 | A1 | 6/2011 | Kitchen |
| 2011/0300957 | A1 | 12/2011 | Crawford et al. |
| 2012/0298825 | A1 | 11/2012 | Fisher |
| 2013/0017893 | A1 | 1/2013 | Feuer et al. |
| 2013/0108992 | A1 | 5/2013 | Beulthoff et al. |
| 2014/0200087 | A1 | 7/2014 | Vatcher et al. |

OTHER PUBLICATIONS 201680025937.1 Chinese Office Action dated Oct. 9, 2018.
JP 2017-557338 Office Action dated Jul. 1, 2019.

* cited by examiner

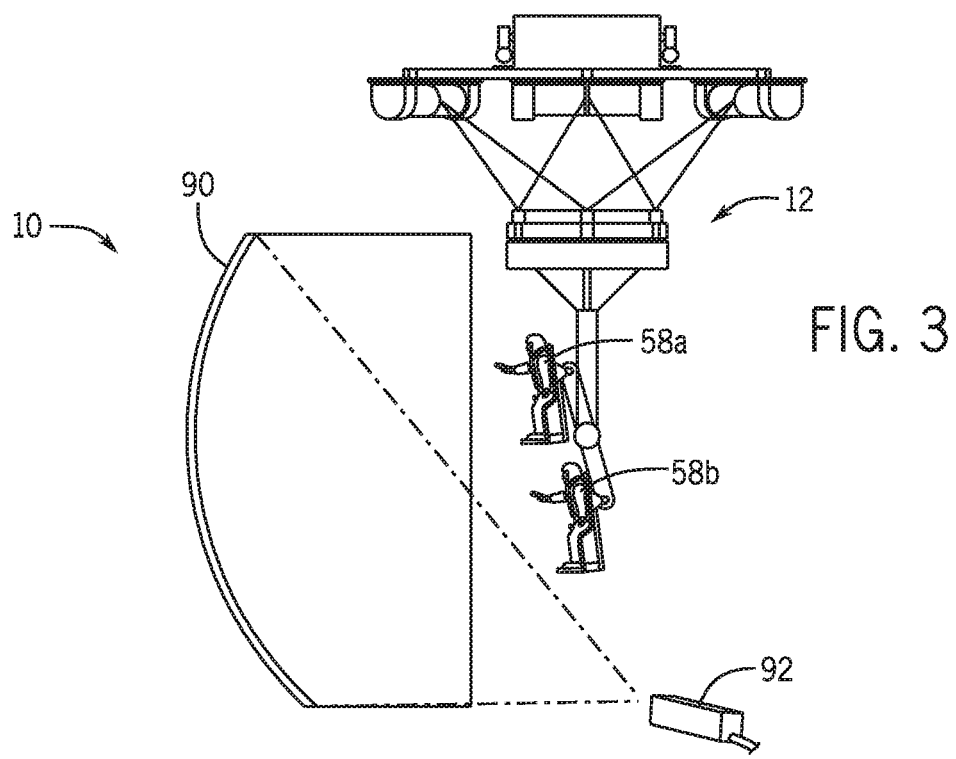
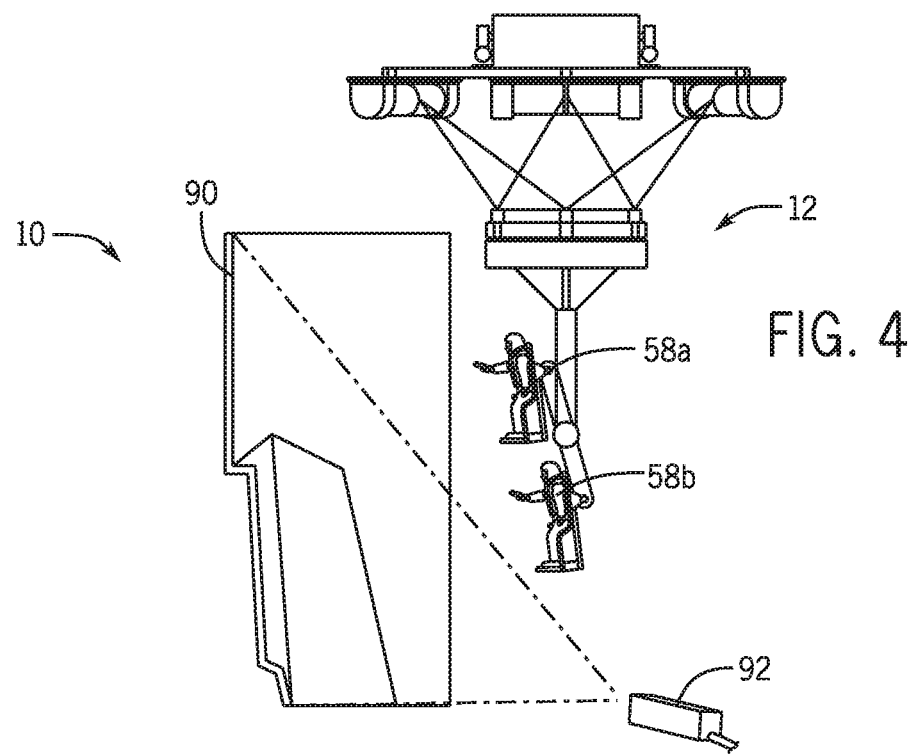

SIMULATOR RIDE

CROSS REFERENCE TO RELATED APPLICATIONS

This application is a continuation of U.S. application Ser. No. 14/704,201, filed May 5, 2015 entitled "SIMULATOR RIDE", the contents of which are herein expressly incorporated by reference for all purposes

BACKGROUND

The present disclosure relates generally to the field of amusement parks. More specifically, embodiments of the present disclosure relate to methods and equipment utilized to provide amusement park experiences.

Various amusement rides have been created to provide passengers with unique motion and visual experiences. In one example, roller coasters and theme rides can be implemented with multi-passenger vehicles that travel along a fixed path. In addition to the excitement created by the speed or change in direction of the vehicles as they move along the path, the vehicles themselves may generate special effects, e.g., sound and/or motion effects. Although a repeat rider may be familiar with the general path of the ride, the special effects may create interest during second and subsequent rides. In another example, certain rides may be implemented with projection elements to create varying scenery and movement as the passenger vehicles travel along the path. However, it is now recognized that regardless of such enhancements to these passenger vehicle rides, the rider in the passenger vehicle may not feel immersed in the ride. For example, the rider generally is aware of being within a ride because of the presence of other passengers in the multi-passenger vehicle as well as being aware of the confines of the vehicle itself. Such awareness of the ride may prevent the ride experience from being a more accurate simulation. Accordingly, there is a need for an improved amusement ride vehicle that simulates certain experiences.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a flying simulator ride is provided. The flying simulator ride includes a track and a bogie coupled to the track. The flying simulator ride also includes a rotator ring and a plurality of cables suspending the rotator ring from the bogie such that the rotator ring is capable of rotating with respect to the track and such that the rotator ring is capable of motion in six degrees of freedom. The flying simulator ride also includes a passenger support system suspended from the rotator ring. The passenger support system includes a first passenger support unit; and a second passenger support unit, wherein at least one of the first passenger support unit or the second passenger support unit are configured to move relative to one another to assume a stacked configuration and a loading configuration, wherein a distance between the rotator ring and the first passenger support unit is decreased in the stacked configuration relative to the loading configuration.

In accordance with another embodiment, a flying simulator ride assembly is provided. The flying simulator ride assembly includes a bogie configured to move along a track; a motion base; and a plurality of cables suspending the motion base from cable control assemblies coupled to the bogie to permit the motion base to move with six degrees of freedom. The flying simulator ride assembly also includes an extending portion fixedly coupled to the motion base and extending away from the bogie; and a passenger support system coupled to the extending portion. The passenger support system includes a first passenger row; a second passenger row; and a support coupled to the extending portion and the first passenger row and the second passenger row, wherein the support is capable of rotating with respect to the extending portion to change a position of one or more of the first passenger row or the second passenger row relative to the motion base.

In accordance with another embodiment, a method is provided. The method includes the steps of rotating a first passenger row relative to a second passenger row to assume a passenger loading configuration; increasing a distance between a track and a motion base to which the first passenger row and the second passenger row are coupled to assume the passenger loading configuration; rotating the first passenger row relative to the second passenger row to assume a flying simulation configuration; and decreasing a distance between the track and the motion base to assume the flying simulation configuration.

DRAWINGS

These and other features, aspects, and advantages of the present disclosure will become better understood when the following detailed description is read with reference to the accompanying drawings in which like characters represent like parts throughout the drawings, wherein:

FIG. 3 is a side view of the flying simulator ride assembly in a ride position and in conjunction with an immersion dome projection surface in accordance with present techniques;

FIG. 4 is a side view of the flying simulator ride assembly in a ride position and in conjunction with a projection-mapped surface in accordance with present techniques;

DETAILED DESCRIPTION

Figure 1:
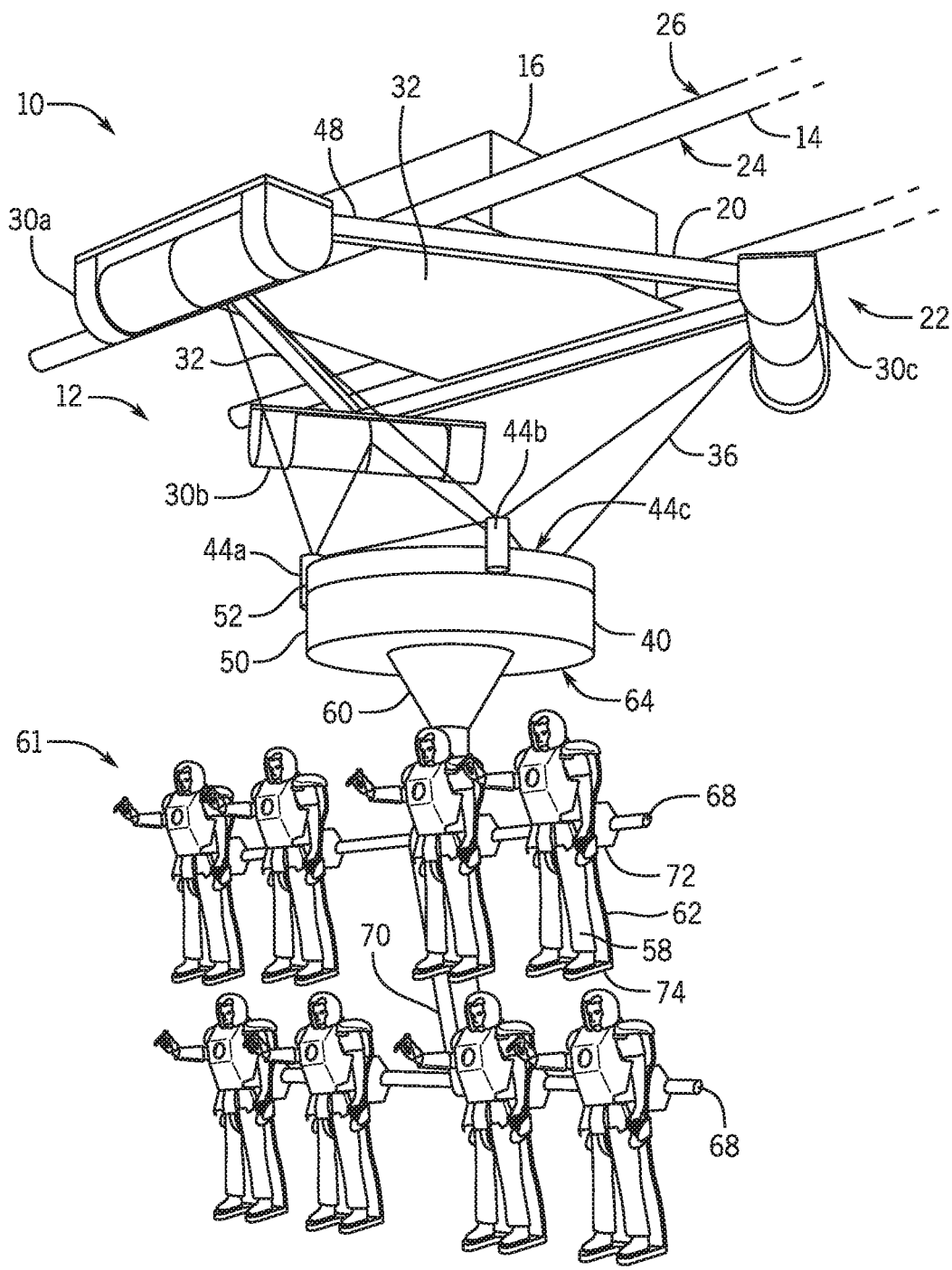
FIG. 1 is a perspective view of a flying simulator ride assembly in accordance with present techniques.

The present disclosure provides a simulator ride. The simulator ride (e.g., flying simulator ride) may include a passenger support system that is implemented without a ride vehicle or other passenger-enclosing structure. In this manner, the passenger feels a more accurate or realistic simulated experience. The present techniques are in contrast to vehicle-based simulation in which the passenger is separated from the environment by a totally or partially enclosed vehicle. While such vehicles may have generally wide fields of view via windows or transparent walls, the feeling of flight, for example, is reduced because the passenger does not feel airflow during the ride and because the vehicle walls separate the passenger from the environment. In addition, a passenger in a vehicle does not feel realistic feedback from arm and leg movement to create an improved simulation of flight. Provided herein is a flying simulator ride with an open-air flight experience that allows passenger arm and leg movement to simulate individual flight, e.g., via a flying suit.

The simulator ride as provided herein may be implemented as a flying simulator rig assembly that is suspended from a bogie that travels along a track during operation of the ride. In one embodiment, the suspended assembly includes a motion base that is configured to translate various types of motion to the passengers, who are in turn suspended from the motion base via a passenger support system. The passenger support system may include a passenger support unit implemented as a standing support in which the passenger is generally upright (or tilted towards the ground) and secured by a harness to a rear base or support. To accommodate multiple passengers for greater ride participation, the passenger support system may include one or more passenger support units in a row and may also include multiple rows. However, one disadvantage of arranging passengers in rows is that passengers in second and subsequent rows may have a less realistic individual flight simulation experience if their view is obstructed by passengers in front of them as well as the other passenger support units of the passenger support system. That is, part of the thrill of the flight simulator as provided is that the passenger support units may be implemented to be generally unobtrusive and arranged out of the passenger's field of view to facilitate the illusion that the flight is generated by an untethered or unconnected flying suit. Accordingly, in one embodiment, the passenger support system may include stacked passenger rows such that a rear row is positioned either higher or lower, relative to the ground, than the front row to provide the illusion that each passenger is flying without the assistance of the ride machinery. For implementations with third, fourth, or more rows, each additional row may be stacked to move any forward rows out of the field of view of the passengers.

While the disclosed embodiments are generally described in the context of amusement park rides, it should be understood that the flying simulator as provided herein may also be used in other contexts. For example, the flying simulator may be used for flight training, sports training (e.g., gymnastics, ice skating, etc.), or therapy purposes.

FIG. 1 is a perspective view of a flight simulator ride 10 including an embodiment of a flying simulator ride assembly 12 positioned along a ride track 14. In operation, a bogie 16 travels along the ride track 14 to move the flying simulator ride assembly 12 along a ride path during the ride 10. The bogie 16 may include pinch wheels or other components to facilitate movement along the ride track 14. The bogie 16 is coupled to a subframe 20 that includes a cable suspension rig 22. As depicted, subframe 20 and the cable suspension rig 22 are positioned on the underside 24 of the ride track 14. However, other arrangements are also contemplated. For example, certain components of the subframe 20 and/or the cable suspension rig 22 may be positioned on a topside 26 of the ride track 14 in other embodiments. The subframe 20 may include one or more cable control assemblies 30, e.g., cable control assemblies 30a, 30b, and 30c, connected by crossbeams 32. Various components of the ride 10 may be coupled to a power source. In one embodiment, the ride components (e.g., the cable control assemblies 30, special effects controllers, motors) may draw power from the power source powering the bogie 16. The bogie 16, in turn, may be coupled to a power source via a cable. In one embodiment, the bogie 16 draws power from the track 14 via an electrical contact.

Each cable control assembly 30 (e.g., motorized winch system) is coupled to one or more cables 36 suspending a motion base 40. The motion base 40 includes cable connector elements 44a, 44b, and 44c (e.g., connectors, grippers, rings) configured to receive one or more cables 36. The cable connector elements 44 may be distributed about a perimeter of the motion base 40 along an upper surface or, in another embodiment, along a side of the motion base 40. The cables 36 are coupled to the motion base 40 and the cable control assemblies 30 such that movement of the motion base 40 may be generated by selective control of an amount of cable extending from the cable control assemblies 30 coupled to various cable connector elements 44 on the motion base 40. An individual cable control assembly 30 may include a winch, pulley, spooling system, motor and/or other cable mechanical controllers that are configured to change a distance between the cable control assembly 30 and the motion base 40 by, for example, spooling or unspooling the cable 36 such that an amount (or length) of cable extending from the cable control assembly 30 to the cable connector element 44 is changed. In one embodiment, the distance between the cable control assembly 30 and the motion base 40 is increased when the cable 36 is unspooled such that an amount of cable 36 extending from the cable control assembly 30 to the cable connector element 44 is increased. Because the motion base 40 is coupled to several cables 36 and associated cable control assemblies 30, the type of motion patterns generated by changing the configuration of various cables 36 may be complex.

The cable suspension rig 22, via control of the cable control assemblies 30 and under control of a control system (see FIG. 8), is capable of causing the motion base 40 to move in multiple degrees of freedom. Such motion may include pitch, roll, and heave as well as surge, sway, and yaw, either alone or in combination with one another. Accordingly, the motion base 40 may be configured to create all six degrees of freedom, depending on the implementation and arrangement of the cables 36, e.g., via different amounts, lengths, or portions of cable 36 spooled out. In a particular embodiment, as shown in FIG. 1, the flying simulator ride assembly includes at least three cable control assemblies 30 arranged in a triangle formation with the cable control assemblies 30 positioned generally at each corner 48. Certain motion patterns may be created by manipulating the cable, e.g., by using a motor of the cable control assembly 30 to wind the cable 36 or to unwind the cable 36. Further, each individual cable control assembly 30 may have cables 36 coupled to one or more cable connector elements 44 on the motion base 40 to generate more complexity and variability of motion.

In one example, the motion base 40 may roll (where the forward direction of the track 14 is considered the x-axis), when the unspooled portion of the cables 36 connected to cable connector element 44a and 44b is decreased and/or the unspooled portion of the cables 36 connected to cable connector element 44c is increased. The reverse pattern would create roll towards the opposite direction. Further, forward pitch may be created by raising 44b relative to 44a, while the reverse of the pattern would generate backwards pitch. In one embodiment, the flying simulator ride assembly 12 is capable of producing 30 degree pitch or roll in the motion base 40. Heave may be generated by an up and down motion, created by simultaneous winding and subsequent releasing of all of the cables 36 to move the motion base 40 up and down. In another embodiment, the flying simulator ride assembly 12 is capable of producing 18 ft. heave. Further, the heave motion may include a superimposed pitch or roll. Other combinations are also contemplated, and motion in any of the six degrees of freedom may be combined in series in a programmed pattern to create various types of flight or motion simulation experiences. The motion base 40 may also include a rotator ring 50 that is capable of complete or partial rotation, e.g., under control of a motor, relative to a motion base suspended support 52 to generate additional types of motion. In one embodiment, the rotator ring 50 is coupled to a central rod that in turn is coupled to a motor that turns the rod to rotate the rotating ring 50.

In operation, motion of the motion base 40 is translated to the passengers 58, who are coupled to the flying simulator ride assembly 12 via an extending portion 60 that in turn is coupled to a passenger support system 61 including one or more passenger support units 62. The extending portion 60 extends downwards and away from the track 14 (and the motion base 40) to suspend the passenger support system 61 and, in turn, the passenger support units 62. As shown, the extending portion 60 extends from a bottom surface 64 of the motion base 40. In embodiments in which the motion base 40 includes the rotator ring 50, the extending portion 60 may be directly coupled to the rotator ring 50 such that rotation of the rotator ring 50 also rotates the extending portion 60 and, in turn, the passengers 58 secured in the passenger support units 62. In one embodiment, the passengers 58 may face forward along the axis of forward movement along the ride track 14 as the bogie 16 moves to enhance a feeling of flying. However, in other embodiments, the passengers 58 may be rotated during the ride 10 to face objects of interest or to enhance certain effects, such as being thrown sideways by an impact.

The extending portion 60 is coupled to a base member 68 of the passenger support system 61 via a support 70. In certain embodiments, the support 70 is configured to rotate relative to the extending portion 60 to move the passenger support units 62 about the axis of rotation. The support 70 may be coupled to additional base members 68 that include other rows of passenger support units 62. The support 70 may be coupled to a motor to control the rotation of the support 70 relative to the extending portion.

In the depicted embodiment, the base member 68 extends along a multi-passenger row and is attached to or forms one or more rear plate portions 72 of the passenger support units 62. In multi-passenger embodiments, the base member 68 may extend from the extending portion 60 to accommodate a plurality of passenger support units 62 along its length (e.g., including any passenger securing components associated with each passenger support unit 62, such as shoulder harnesses). Each individual passenger support unit 62 may include various features to support and secure the passenger 58 to the flying simulator ride assembly 12. For example, the rear plate portion 72 may be sized and shaped to support the passenger 58 along the passenger's back. In one embodiment, the rear plate portion 72 forms an integral platform 74 for the passenger's feet.

While the depicted embodiment shows a single flying simulator ride assembly 12 in position on the track 14 it should be understood that a ride 10 may be implemented with multiple assemblies 12 that are in position at various points along the track 14. That is, an individual flying simulator ride assembly 12 may start in a staggered manner relative to other flying simulator ride assemblies 12 in the ride such that the passengers in one flying simulator ride assembly 12 have limited visual contact with other assemblies 12.

Figure 2:
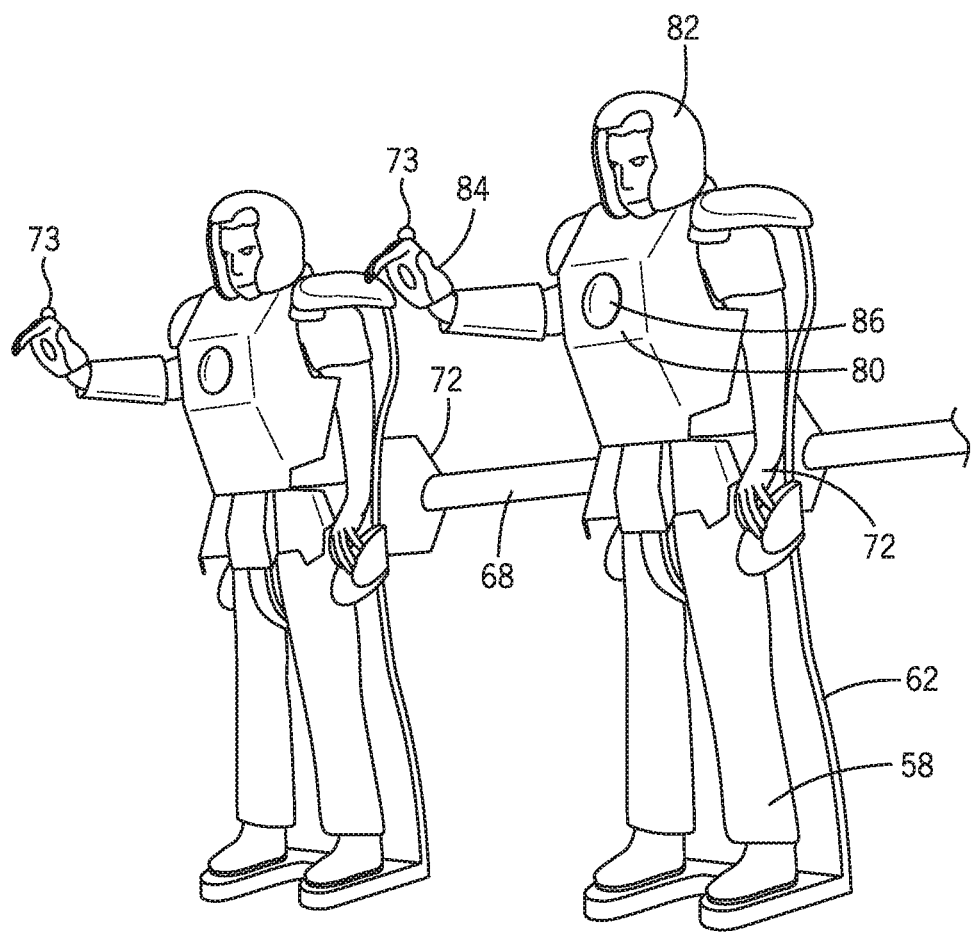
FIG. 2 is a detail view of passenger support units of the flying simulator ride assembly FIG. 1.

FIG. 2 is a detail view of an example of passenger support units 62 of FIG. 1. Each passenger support unit 62 may include passenger securing components and/or special effects components. For example, the passengers 58 are secured to the rear plate portion 72 via a harness 80. The harness 80 may include a helmet 82 and additional accessories (e.g., a glove 84) that are generally configured according to a theme of the ride 10. For example, the harness 80 may be configured in a military or animal theme to enhance the ride experience and the passenger's immersion in the ride 10. In one embodiment, the helmet 82 may include built-in audio effects, such as speakers, and/or visual effects, such as 3D glasses or side panel screens (e.g., projection or backlit screens). For multi-passenger embodiments, in one implementation, each individual helmet 82 may be independently addressable by a control system to produce individualized audio and/or visual effects, depending on the desired ride narrative. For example, if the ride 10 is interactive, the audio and/or visual effects may be affected by passenger inputs. In other embodiments, different passengers 58 may be assigned different roles or characters within the ride 10 and may receive different effects based on the character. The helmet 82 may function to provide additional immersion in the theme by blocking adjacent passengers 58 from view.

The helmet 82 may be configured to be fixed in place such that the passenger 58 cannot move his head. In another embodiment, the helmet 82 may be configured to pivot to permit the passenger 58 to swivel his head when the helmet 82 is in place. The harness 80 may also include certain feedback or effect capabilities (e.g., vibration, shaking, temperature changes). For example, in one embodiment, the harness 80 may include an impact chest plate 86 that may be configured to provide certain sensation effects to the passenger 58 under processor control at appropriate times during the ride to enhance the ride narration. For example, the impact chest plate 86 may be programmed to vibrate in conjunction with a projected image of an explosion. Other special effects may be facilitated via forced feedback in the glove 84. Further, each individual passenger support unit 62 may be associated with a separate motion controller and coupling base. For example, the rear plate portion 72 coupling each passenger support unit 62 to the associated base member 68 may include a coupling or motion base that allows each passenger support unit 62 to move separately and uniquely relative to the other passenger support units 62. Such movement may be based on (controlled by) user inputs to an onboard control feature 73 (e.g., motion control unit or automotion controller) in communication with a control system (see FIG. 8). This may facilitate a more unique and user-specific experience. In one embodiment, the onboard control feature 73 may facilitate movement of the passenger support unit 62 relative to the base member (e.g., up or down, side-to-side movement). In another embodiment, the movement may permit angling of the passenger support unit 62 relative to the base member 68 within certain permissible ranges (e.g., tilting downward/upwards within 30 degrees or left or right within 30 degrees). Such movement may be mediated by the coupling or motion base, which may move under the control of a motor.

In addition to effects mediated via the passenger support units 62 (e.g., via the harness 80), the flying simulation experience of the ride 10 may be enhanced through projected images that create the sensation of movement. FIG. 3 is a side view of a flying simulator ride 10 that includes a projection surface 90 onto which images from a projector 92 may be displayed. In another embodiment as illustrated by a side view of the ride 10 in FIG. 4, the projected images may be target-mapped onto irregular surfaces of the ride 10 for additional interest. For example, combining real-world changes in topography with superimposed projected images may yield more realistic renderings of ride components. In a particular embodiment, the projected images may work in concert with the motion to achieve ride narrative effects. For example, for a space-themed ride, the projection surface 90 may show asteroids that appear to be hurtling towards the passengers 58. The bogie 16 may be instructed to increase a velocity to enhance the sensation of the asteroids and the passengers 58 moving towards an impact. The flying simulator ride assembly 12 may also generate motion via the motion base to move the passengers 58 side-to-side to provide the effect of narrowly missing an impact with the asteroids. Accordingly, a ride controller may control the effects and the motion to work together to create desired effects. In another embodiment, the ride 10 may be a nature-themed ride. The passengers may look down to see projected images of fantastic beasts or monsters below their feet. As the projection surface shows a monster that leaps towards the passengers, the motion base 40 may substantially simultaneously initiate a pitch motion to create a thrilling sensation that the monster has almost snatched them from the sky. In addition, if the monster is a dragon, the special effects components in the passenger support units 62 may be programmed to heat up to create a sense that a dragon is breathing fire in concert with a projected fire image and, in certain embodiments, smoke or fire effects generated with the ride environment or with each passenger support unit 62.

As shown in FIG. 3 and FIG. 4, the passengers 58 are arranged so that each passenger has an unobstructed view of the projected images to enhance the feeling of immersion in the ride 10. For example, passenger 58a is stacked above passenger 58b. The flying simulator ride assembly 12 may be configured to assume a stacked configuration for the active flying simulation portion of the ride in which multiple passenger rows are stacked relative to one another to achieve the unobstructed views.

Figure 5:
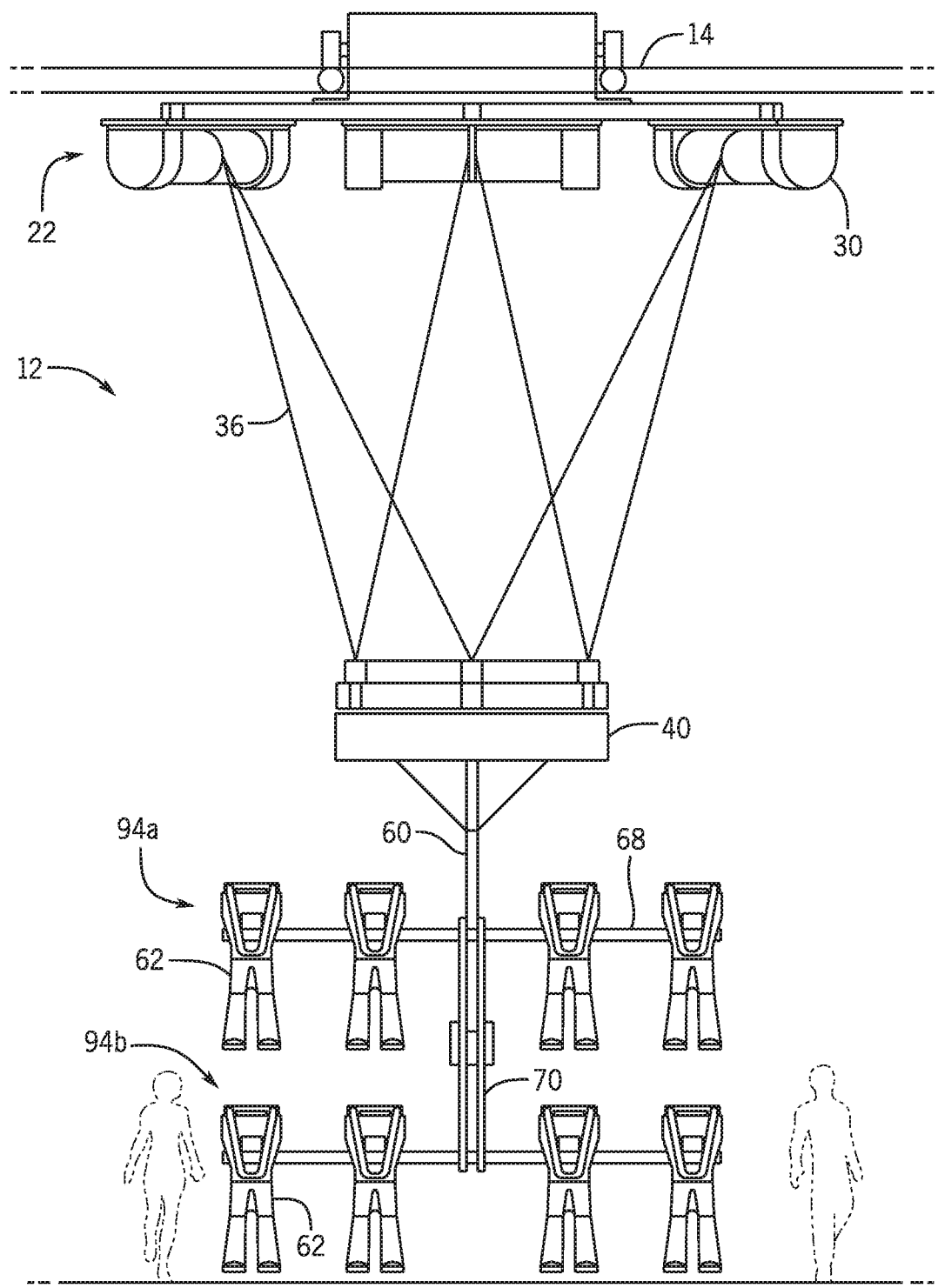
FIG. 5 is an elevational front view of the flying simulator ride assembly in a ride position in accordance with present techniques.

An embodiment of a stacked configuration is shown in the elevational front view of FIG. 5. The passenger support units 62 in a forward row 94a and a rear row 94b are offset relative to one another. In the depicted embodiment, the forward row 94a of passenger support units 62 is higher (or closer to the track 14) than a rear row 94b of passenger support units 62. However, it should be understood that this arrangement may be reverse, with the rear row 94b of passenger support units 62 being positioned higher than the forward row 94a of passenger support units 62. In some embodiments, reconfiguration between each orientation may be selectable. The offset configuration may be implemented via the support 70 that is rotatably coupled to the extending portion 60. Further, the flying simulator ride assembly 12 may include additional (e.g., third, fourth, etc.) rows of passenger support units 62. In one embodiment, the base member 68 may be generally axial such that, within an individual row, e.g., forward row 94a, adjacent passenger support units 62 are visible only in a passenger's peripheral vision. In another embodiment, the base member 68 may be slightly bowed or arched, with a centermost passenger support unit 62 being positioned forward relative to other passenger support units 62 toward the edges of the base member 68. Such an embodiment may position adjacent passengers 58 outside of each other's peripheral vision. Depending on the arrangement and configuration of a passenger helmet, the visibility of adjacent passengers may be further minimized. Such an arrangement in which other passengers are less visible and apparent may contribute to the feeling of individual flying and immersion.

The cables 36 of the suspension rig 22 are shown in FIG. 5 as being arranged with regard to cable configuration to yield a relatively flat orientation of the motion base 40 (i.e., relatively parallel to the track 14). However, the track 14 may also bend, dip, and/or curve. Accordingly, the cables 36 may be adjusted by the cable control assemblies 30 to maintain the motion base 40 in a generally flat orientation regardless of the track arrangement as the bogie 16 traverses the track 14. However, in other embodiments, the changes in the configuration of the track 14 may be translated to the motion base 40 and, in turn, to the passengers 58 via the passenger support units 62 (e.g., harnesses, other restraint components). As such, a curve in the track 14 may result in a corresponding tilt or roll of the motion base 40. Such adjustments may also be implemented in the context of programmed simulation motion patterns. For example, a ride narrative of travelling through a wind tunnel may yield rocking or pitching motions. Such motion effects are also at least in part generated via changes in cable configuration that in turn move the motion base 40.

Figure 6:
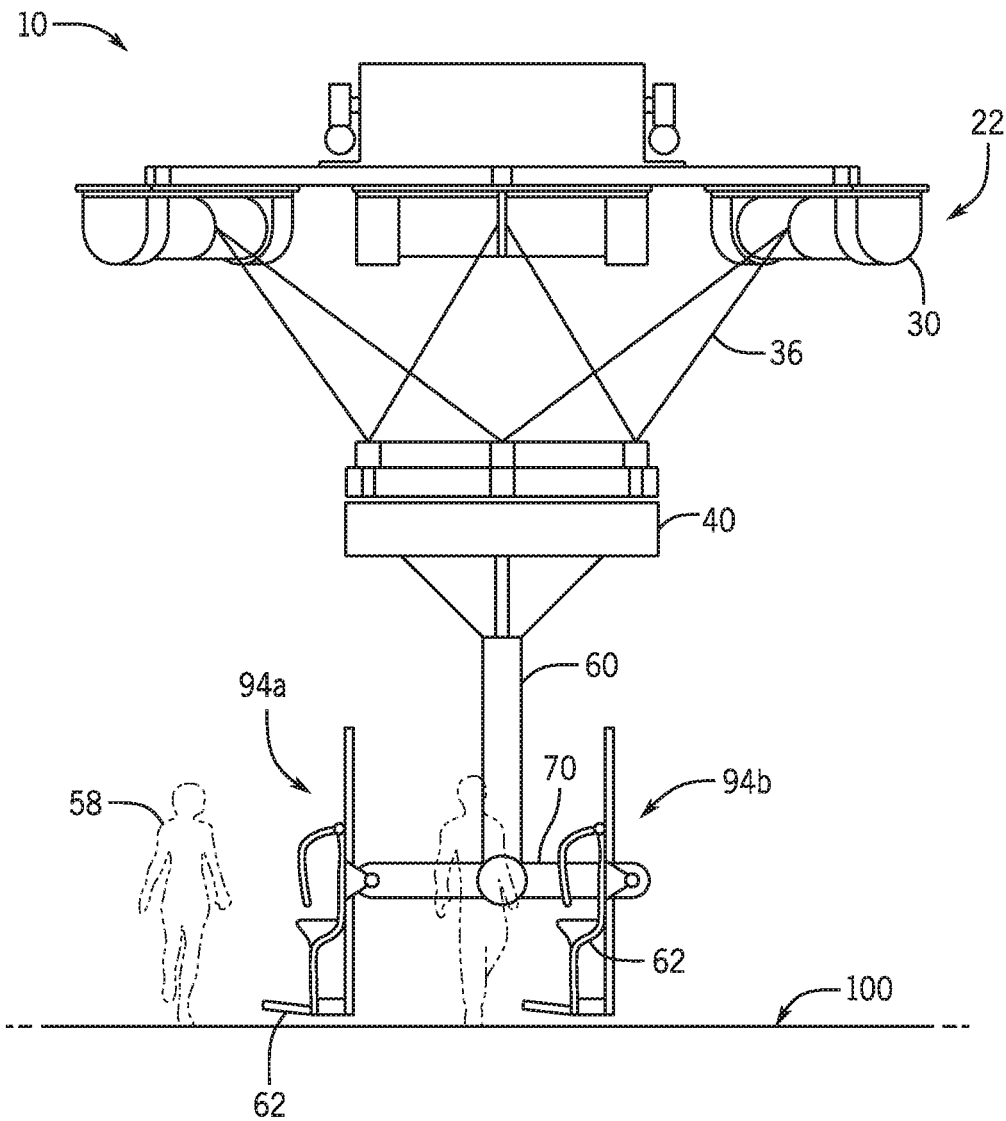
FIG. 6 is an elevational side view of a flying simulator ride assembly in a passenger loading position in accordance with present techniques.

The flying simulator ride assembly 12 may also assume an inactive or passenger loading and/or unloading configuration, as shown by the elevational side view provided in FIG. 6. The flying simulator ride assembly 12 may assume such a configuration at the start of the ride 10, such that passengers 58 can easily be secured within the passenger support units 62. Further, the passenger loading configuration permits ride technicians to assist passengers. The passenger loading configuration may also be coincident with passenger unloading at the end of the previous ride 10. In contrast to the stacked configuration of FIG. 5, the passenger loading/unloading configuration of FIG. 6 features both the forward row 94a and rear row 94b both being positioned on or near a ground surface 100 and the same distance away from the motion base 40 or track. As noted, the positions of the forward row 94a and the rear row 94b may be adjusted via rotation of the support 70. Accordingly, to assume the passenger loading/unloading configuration, the support 70 may rotate relative to the extending portion 60. In the depicted embodiment, the support 70 is approximately parallel to the ground surface 100 in the passenger loading/unloading configuration. However, other arrangements are also contemplated. For example, the support 70 may be a curved arm. Further, the support 70 may be implemented as two or more separate pieces. In other embodiments, the support 70 may be fixed relative to the extending portion 60 such that passenger loading and unloading is accomplished in a multi-level manner, e.g., using steps or platforms.

Figure 7:
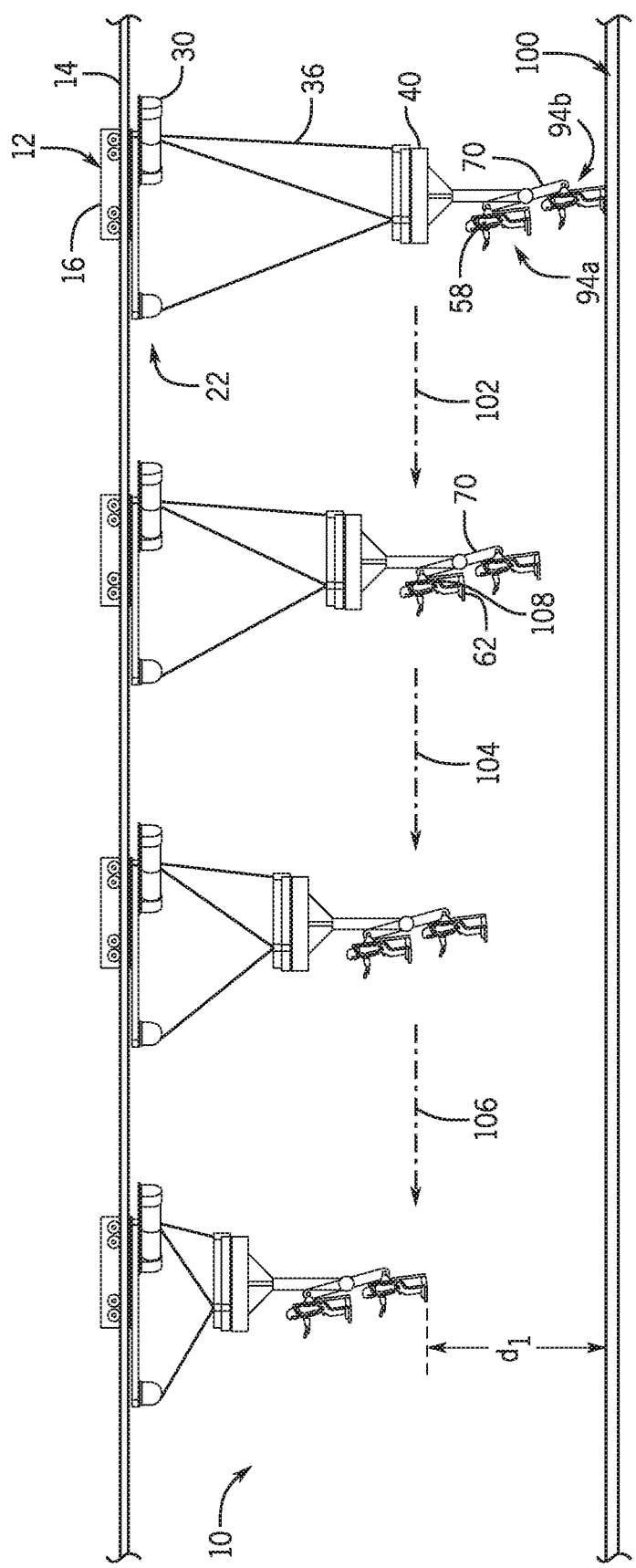
FIG. 7 is a side view of a flying simulator ride assembly in various positions in accordance with present techniques.

Once the passengers 58 are loaded into the passenger support units 62, the support 70 can rotate into stacked position for entry into the ride 10. FIG. 7 is a side view of a progression along a track 14 of a flying simulator ride assembly 12 after passenger loading. Initially, the support 70 is rotated such that the forward row 94a is off the ground surface 100 before the bogie 16 moves along the track 14. As the bogie 16 progresses (shown by arrows 102, 104, and 106), the suspension rig 22, via the cable control assemblies 30, configures the cables to lift the motion base 40 relative to the ground surface 100 until a desired height, depicted as d₁, for flight simulation is reached.

In certain embodiments, the position of the passenger support units 62 and the resulting passenger tilt or angle may remain fixed relative to the support 70. That is, the passengers 58 may remain upright or slightly tilted during rotation of the support 70 and during flight simulation. However, in other embodiments, the passenger support units 62 may be coupled to the support 70 via an articulating joint 108 to permit the passenger support units 62 to tilt up or down. In this manner, the passengers may achieve a face-down flying experience.

Figure 8:
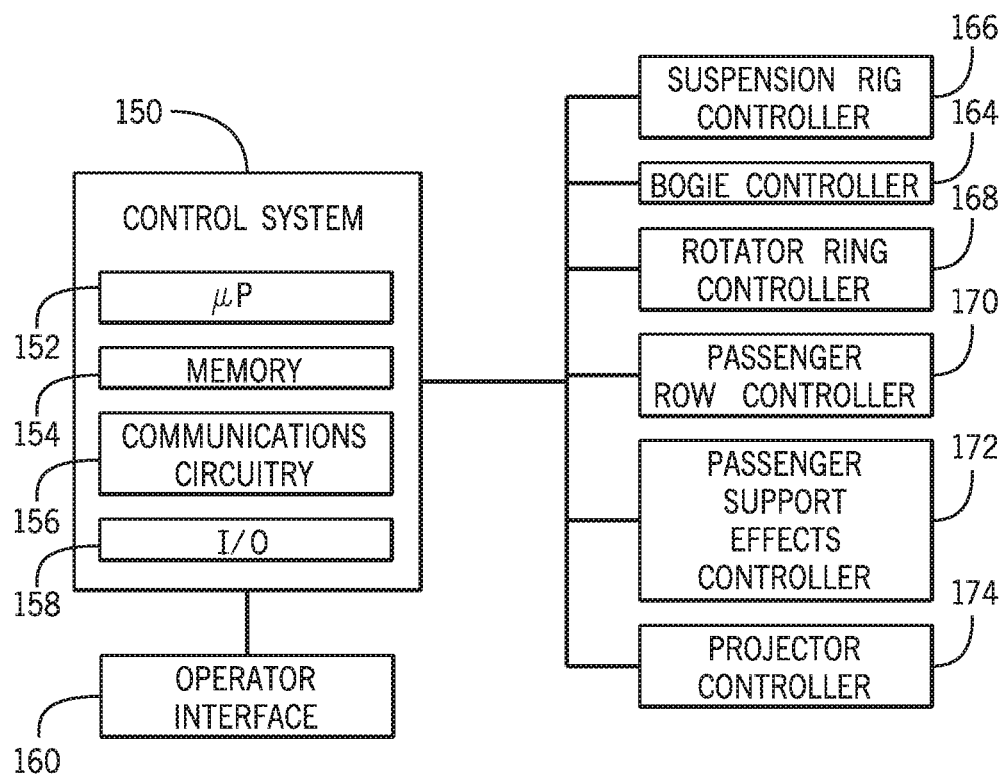
FIG. 8 is a block diagram of a flying simulator ride control system in accordance with present techniques.

The flying simulator ride 10 may operate under a control system 150, as shown in the block diagram of FIG. 8. The control system 150 may include a processor 152, which may include one or more processing devices, and a memory 154 storing instructions executable by the processor 152. The memory 154 may include one or more tangible, non-transitory, machine-readable media. By way of example, such machine-readable media can include RAM, ROM, EPROM, EEPROM, optical disk storage, magnetic disk storage or other magnetic storage devices, or any other medium which can be used to carry or store desired program code in the form of machine-executable instructions or data structures and which can be accessed by the processor 152 or by any general purpose or special purpose computer or other machine with a processor. The control system 150 may also include communications circuitry 156 and/or input and output circuitry 158 to facilitate communication with other components of the flying simulator ride 10. In addition, the control system 150 may be coupled, either directly or wirelessly, to an operator input device or operator interface 160 that, in operation, may be used by a ride technician to provide input used to control one or more ride features. The operator interface 160, or other components of the ride 10, may be located remotely from the control system 150 in certain embodiments and may be, for example, implemented on a mobile device.

In operation, the control system 150 may control movement of the flying simulator ride assembly 12 (see FIG. 1). For example, the control system 150 may communicate with and provide instructions to a bogie controller 164 to control velocity and/or braking. The control system 150 may also control flying simulation motion via control of a suspension rig controller 166 and a rotator ring controller 168. In addition, the control system 150 may also provide instructions to a passenger row controller 170 to control positioning of the passengers. In yet another embodiment, the control system 150 may provide instructions to one or more special effects controllers, such as passenger support effects controllers 172 (e.g., to control circuitry in helmets, chest plates, or gloves to cause audio or visual effects, vibrations, impact effects, or changes in temperature) or projector controllers 174. The control system 150 may be configured to independently address each passenger support unit for individual control of effects, e.g., each passenger support unit may be capable of providing unique and separate effects relative to other passenger support units.

Figure 9:
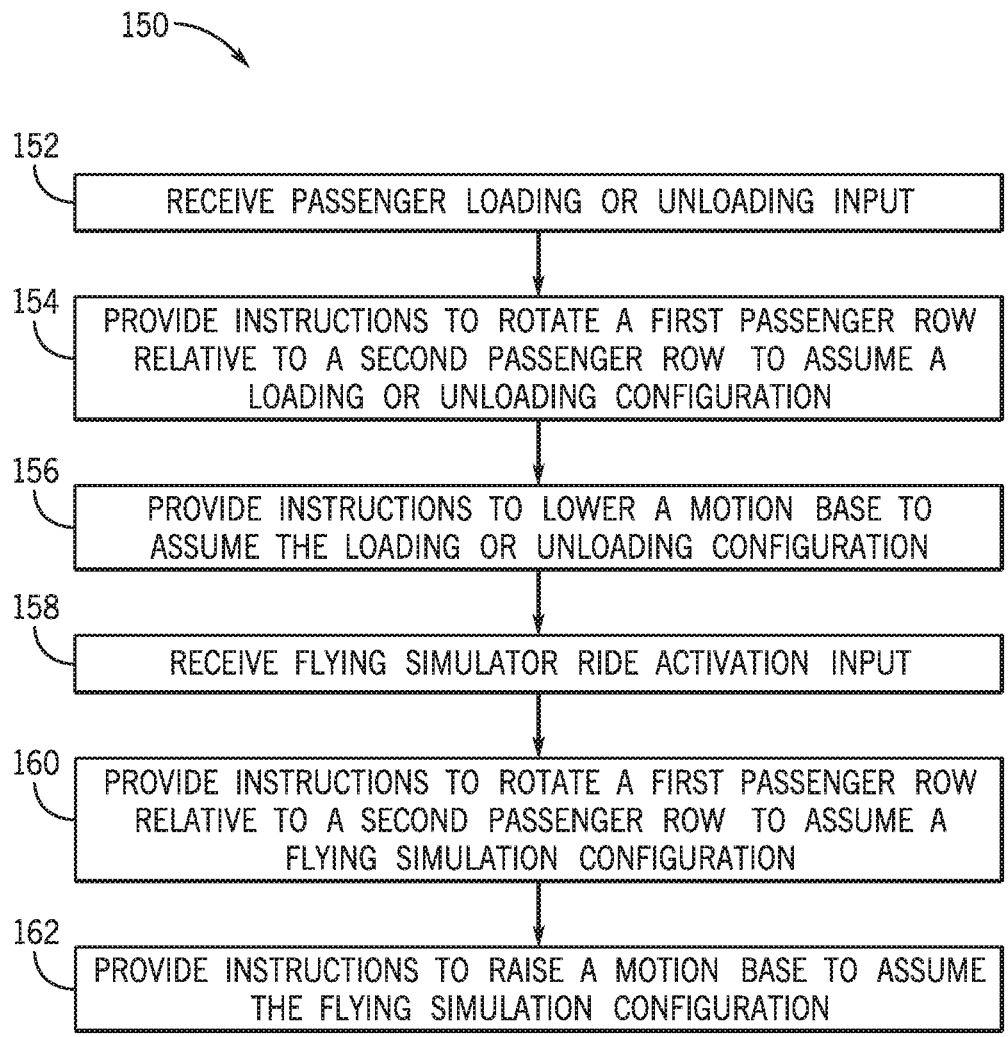
FIG. 9 is a flow diagram of operating a flying simulator ride system in accordance with present techniques.

FIG. 9 is a flow diagram of a method 150 of operating the flying simulator ride 10. As a ride sequence begins, the flying simulator ride assembly 12 (see FIG. 1) enters a passenger loading/unloading area. Upon receiving an input that passenger loading/unloading will commence (block 152), the controller (e.g., control system 150 of FIG. 8) provides instructions to flying simulator ride assembly 12 to rotate a first passenger row relative to a second passenger row to assume a loading or unloading configuration (block 154). Instructions are also provided to lower a motion base 40 (see FIG. 1), e.g., via increasing a portion of the suspension cables between the motion base 40 and the cable control assemblies, and, in turn, the passenger support units suspended from the motion base 40) to assume a height associated with the loading or unloading configuration (156). The loading or unloading configuration may be characterized by positioning both the first and second passenger rows approximately on or near the ground. When the passengers are loaded into the flying simulator ride assembly 12, a ride technician may provide an input, e.g., via the operator interface, that the ride is ready to be activated. When the activation input is received (block 158), the controller may provide instructions to then rotate the first passenger row and/or the second passenger row into a flying simulation configuration (block 160) as well as to raise a motion base 40 to a desired height for flying simulation (block 162).

While certain embodiments of the disclosure have been disclosed in the context of cable suspension, in other embodiments, the flying simulator ride assembly 12 may employ hydraulic or other techniques to generate motion via the motion base 40.

While only certain features of present embodiments have been illustrated and described herein, many modifications and changes will occur to those skilled in the art. It is, therefore, to be understood that the appended claims are intended to cover all such modifications and changes as fall within the true spirit of the disclosure. While certain disclosed embodiments have been disclosed in the context of amusement or theme parks, it should be understood that certain embodiments may also relate to other uses. Further, it should be understood that certain elements of the disclosed embodiments may be combined or exchanged with one another.

The invention claimed is:

1. A flying simulator ride comprising:
   a track;
   a bogie coupled to the track;
   a rotator ring;
   a plurality of cables extending from one or more cable control assemblies coupled to the bogie and suspending the rotator ring from the bogie such that the rotator ring is capable of rotating with respect to the track and such that the rotator ring is capable of motion in six degrees of freedom;
   a passenger support system configured to support passengers of the flying simulator ride and coupled to the rotator ring, wherein the passenger support system is configured to assume a ride configuration in which a portion of the passenger support system is moved away from the rotator ring; and
   a display surface spaced apart from the passenger support system, wherein the passenger support system in the ride configuration is configured to orient the passengers towards the display surface.

2. The flying simulator ride of claim 1, wherein the display surface is positioned under the passenger support system or on a bottom surface of the flying simulator ride.

3. The flying simulator ride of claim 1, wherein the display surface is irregular.

4. The flying simulator ride of claim 1, comprising a ride controller coupled to a projector, wherein the projector is configured to project images onto the display surface.

5. The flying simulator ride of claim 1, comprising a ride controller coupled to the one or more cable control assemblies and configured to cause the one or more cable control assemblies to change an amount or a length of one or more of the plurality of cables extending between the one or more cable control assemblies and the rotator ring.

6. The flying simulator ride of claim 5, wherein the ride controller comprises a processor configured to execute instructions stored in a memory to cause the one or more cable control assemblies to change the amount or the length of the one or more of the plurality of cables extending between the one or more cable control assemblies and the rotator ring.

7. The flying simulator ride of claim 5, comprising an effects controller coupled to the ride controller.

8. The flying simulator ride of claim 5, wherein the effects controller is controlled via instructions from the ride controller to provide one or more special effects to the passengers associated with images on the display surface.

9. The flying simulator ride of claim 8, wherein the special effects are sound effects provided through speakers associated with the passenger support system.

10. The flying simulator ride of claim 5, wherein the one or more cable control assemblies are controlled via instructions from the ride controller to cause the one or more cable control assemblies to change the amount or the length of one or more of the plurality of cables extending between the one or more cable control assemblies and the rotator ring to create motion effects associated with images on the display surface.

11. The flying simulator ride of claim 1, wherein the passenger support system is configured to assume the ride configuration after assuming an initial passenger loading configuration.

12. A system comprising:
a bogie configured to move along a track;
a motion base;
a plurality of cables suspending the motion base from cable control assemblies coupled to the bogie to permit the motion base to move with six degrees of freedom;
an extending portion fixedly coupled to the motion base and extending in a direction away from the bogie;
a passenger support system configured to move between a passenger loading configuration and a ride configuration via rotation of the passenger support system relative to the extending portion; and
a ride controller coupled to the cable control assemblies and a passenger support controller and storing instructions in a memory that, when executed by a processor, cause the passenger support controller to move between the passenger loading configuration and the ride configuration.

13. The system of claim 12, wherein the instructions from the ride controller are configured to cause the passenger support system to move to the ride configuration before causing the bogie to move along the track.

14. The system of claim 12, comprising a plurality of helmets or glasses assemblies, wherein respective helmets or glasses assemblies are configured to be worn by respective passengers and wherein each helmet or glasses assembly comprises one or more screens coupled to the ride controller.

15. The system of claim 14, wherein each helmet or glasses assembly is independently addressable by the ride controller.

16. The system of claim 15, wherein the ride controller is configured to provide different display images to respective helmet or glasses assemblies based on a character associated with each helmet or glasses assembly.

17. The system of claim 12, comprising a display screen spaced apart from the passenger support system.

18. The system of claim 12, wherein the cable control assemblies are controlled via instructions from the ride controller to change an amount or a length of one or more of the plurality of cables extending between the cable control assemblies and the motion base to create motion effects.

19. A flying simulator ride assembly comprising:
a track;
a bogie coupled to the track;
a motion base;
a plurality of cables extending from one or more cable control assemblies coupled to the bogie and suspending the motion base from the bogie such that the motion base is capable of motion in six degrees of freedom;
a passenger support system configured to support passengers of the flying simulator ride and coupled to the motion base, wherein the passenger support system comprises
a first passenger row; and
a second passenger row, wherein one or both of the first passenger row or the second passenger row is configured to move relative to the motion base to move between a ride configuration and a loading configuration and wherein the first passenger row and the second passenger row are oriented towards a display screen in the ride configuration.

20. The flying simulator ride assembly of claim 19, wherein the first passenger row and the second passenger are coupled to a support that rotates to move the passenger support system between the ride configuration and the loading configuration.

21. The flying simulator ride assembly of claim 19, wherein the passenger support system comprises a plurality of passenger restraint components.

22. The flying simulator ride assembly of claim 21, wherein the plurality of passenger restraint components are coupled to a rear base of the passenger support system.

* * * * *